(12) United States Patent
Kociemba et al.

(10) Patent No.: US 6,468,372 B2
(45) Date of Patent: Oct. 22, 2002

(54) ON-SITE TOOLING AND METHOD FOR REPAIRING A DAMAGED ZONE IN A COMPOSITE STRUCTURE

(75) Inventors: Fabienne Kociemba, Toulouse; Daniel Soro, Jouy/Seine, both of (FR)

(73) Assignee: Aerospatiale Societe Nationale Industrielle, Paris (FR)

( * ) Notice: Subject to any disclaimer, the term of this patent is extended or adjusted under 35 U.S.C. 154(b) by 0 days.

(21) Appl. No.: 09/780,403

(22) Filed: Feb. 12, 2001

(65) Prior Publication Data

US 2001/0008161 A1 Jul. 19, 2001

Related U.S. Application Data

(62) Division of application No. 09/423,208, filed as application No. PCT/FR98/01075 on May 28, 1998, now Pat. No. 6,206,067.

(30) Foreign Application Priority Data

May 29, 1997 (FR) .............................. 97 06602

(51) Int. Cl.[7] .............................. B32B 31/00
(52) U.S. Cl. .............................. 156/71; 156/94; 156/98; 156/285; 156/382
(58) Field of Search .............................. 156/71, 94, 98, 156/285, 382

(56) References Cited

U.S. PATENT DOCUMENTS

| 4,554,036 A | 11/1985 | Newsom |
| 4,808,253 A | 2/1989 | Mimbs |
| 4,916,880 A | 4/1990 | Westerman, Jr. |
| 4,978,404 A | 12/1990 | Westerman, Jr. |
| 5,023,987 A | 6/1991 | Wuepper et al. |
| 5,207,541 A | 5/1993 | Westerman et al. |
| 5,271,145 A | 12/1993 | Westerman et al. |
| 5,442,156 A | 8/1995 | Westerman et al. |
| 5,951,808 A | * 9/1999 | Lacour et al. ........... 156/273.7 |

FOREIGN PATENT DOCUMENTS

| EP | 0 180 865 | 5/1986 |
| FR | 2 705 914 | 12/1994 |

OTHER PUBLICATIONS

Dastin, S., "Repairing Advanced Composite Materials," *Machine Design*, vol. 58, No. 4, Feb. 1986, pp. 86–90.

* cited by examiner

*Primary Examiner*—James Sells
(74) *Attorney, Agent, or Firm*—Thelen Reid & Priest LLP; Robert E. Krebs

(57) ABSTRACT

The present invention relates to on-site repairs of a composite structure (10) such as an aircraft structure in which a concave recess (14) is machined in the damaged zone, a non-polymerized composite part (16) is set into said recess and part (16) is polymerized under pressure using tooling (18) comprising a stack of plates (32) that increase the pressure applied to the composite part. The present invention thus obtains invisible repairs with mechanical characteristics that are similar to those of the initial structure.

4 Claims, 1 Drawing Sheet

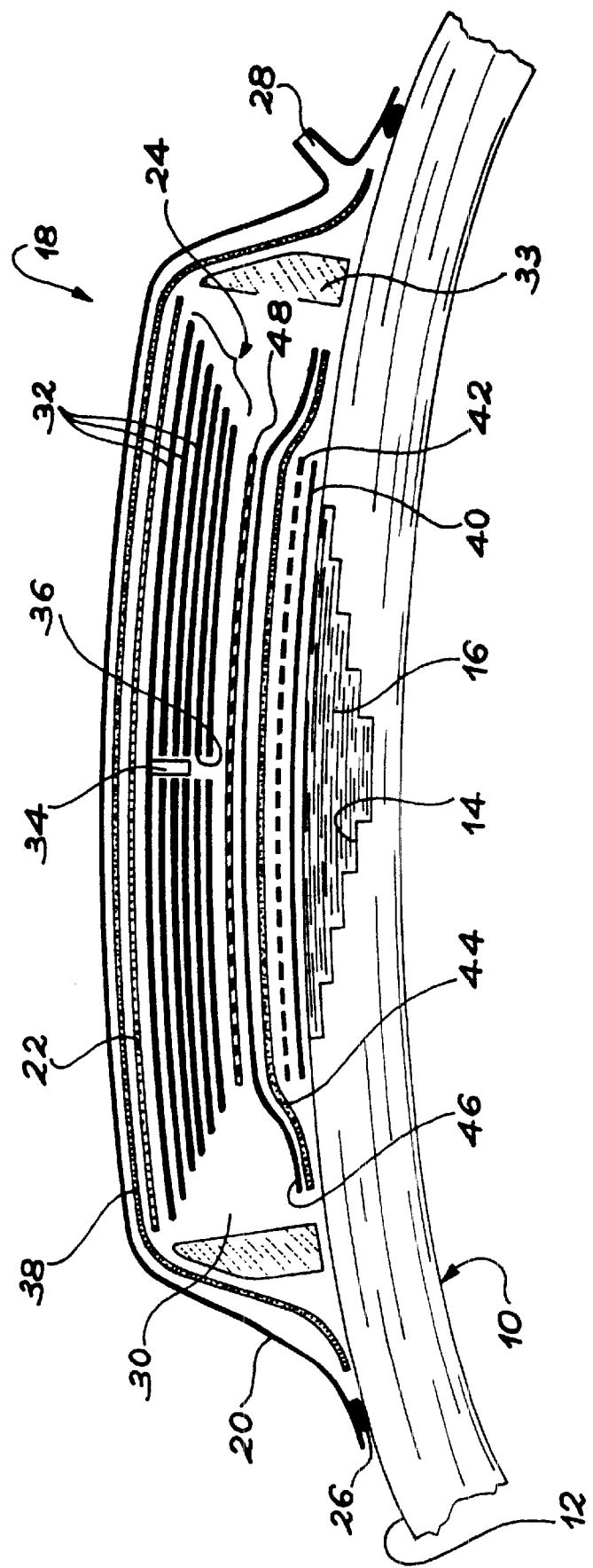

ON-SITE TOOLING AND METHOD FOR REPAIRING A DAMAGED ZONE IN A COMPOSITE STRUCTURE

This application is a divisional of U.S. patent Ser. No. 09/423,208, U.S. Pat. No. 6,206,067 filed Jan. 20, 2000, national phase of PCT/FR98/01075 filed May 28, 1998, and International Application No. 97/06602, which was filed on May 29, 1997, and was not published by the International Bureau in English.

FIELD OF THE INVENTION

The present invention relates to tooling designed to repair a composite structure with a damaged zone without the structure having to be displaced to a repair site different from that in which the structure is located.

The term "composite structure" as used here and in the text that follows refers to a structure composed of long fibers, such as carbon or other fibers, arranged in superimposed layers or folds that are embedded in a resin matrix.

The invention also relates to a method for repairing a composite structure using this kind of tooling.

The tooling and method of the invention may be used in any situation where it is not possible or too impractical to send the structure to a specialized workshop or put it through an autoclave. One of the principle applications for the tooling and method of the invention thus relates to repairing composite structures on aircraft.

BACKGROUND ART

Composite materials enable mechanical characteristics to be obtained that are perfectly controlled and comparable to those obtained using metal, while being considerably lighter. Furthermore, the manufacturing techniques of these materials are continually being improved, both in terms of the shapes and measurements of the parts and the length of manufacture time and cost. It is for these various reasons that composite structures are being used more and more frequently in aircraft.

However, compared to metal structures, composite structures have the drawback of being more fragile when they are subjected to impact. When a composite structure is violently hit by an object variable degrees of breaking or cracking occur in the zone of impact. The increase in the number of composite structures used in aircraft has therefore led to significant improvements in the techniques used to repair these structures.

Two criteria should be adopted when the quality of a repair on an aircraft composite structure is evaluated: the appearance of the repaired zone and the mechanical characteristics of the structure in this zone. Furthermore, it is essential for the repair work to be carried out on-site, i.e. in the place where the aircraft is located, in order for costs to be reduced and to limit aircraft downtime to a minimum. In practice this rules out the use of autoclaves.

Appearance is an important criterion given that the damaged zone is usually located on the outside of the aircraft, i.e. in a zone that can be seen. It is therefore preferable for the zone to resemble the composite structure before it was damaged, such that it is practically invisible.

Moreover, the larger the damaged zone, the more crucial it becomes for the mechanical characteristics of the repaired zone to be as close as possible to those initially present in the composite structure before it was damaged.

At present a number of devices exist that enable composite structure repairs to be carried out on-site when the damaged zone is relatively small. These devices include tooling for step machining or scarf machining a recess in the damaged zone of the composite structure and tooling used to polymerize a composite part placed in the recess under pressure.

U.S. Pat. Nos. 5,207,541 and 5,271,145 concern machining tooling. Tooling of this kind is generally used to machine circular- or oval-shaped recesses. However, other shapes are also possible, as disclosed by U.S. Pat Nos. 4,916,880 and 4,978,404.

The composite part set into a recess as described is of a shape that matches that of the recess. The composite part generally comprises several layers or folds of long fibre fabric and non-polymerized resin. If appropriate, the fabric may previously be impregnated with resin or be initially dry. If the fabric is dry the resin can either be applied as a liquid on each layer of fabric or as solid film interposed between the various layers of dry fabric.

Generally, the tooling used to polymerize and compact the composite part mainly comprises a heating cap that raises the resin to the temperature at which it polymerizes and a bladder fastened around the composite part such that it forms a leaktight seal on the surface of the composite structure. The bladder is connected to an external source of negative pressure such that pressure may be applied to the composite part.

As shown in U.S. Pat. No. 4,554,036, the pressure applied to the composite part in this standard tooling remains very reduced, for example approximately 1.5 bar.

This kind of tooling can therefore be used for "cosmetic" repairs, in other words for reconstituting the original appearance of the composite structure. However, this tooling affects the mechanical characteristics of the repaired zone and can reduce the characteristics by up to 30% compared to the structure in its original condition. Repair work using this technique is, therefore, limited to only small damaged zones.

When larger zones are damaged the damaged composite structure is usually completely replaced and then sent to be repaired in a specialist workshop equipped with autoclaves that perform high pressure polymerization under appropriate conditions.

In another known technique a composite part is molded in an autoclave into a shape that matches that of the recess previously machined in the damaged zone. The composite part is then polymerized and compacted in an autoclave before being bonded into place in the recess. This technique is discussed in American patent 5 023 87.

The major drawback of this technique is that the ability to withstand fatigue in the bonded zone is relatively limited, thus constituting a particular drawback for the aeronautics industry. It is for this reason that the fastening of the additional composite part is generally completed by other fastening means, such as bolts or rivets, that require access via the rear surface of the structure. The repair work can be seen from the outside and does not, therefore, meet the above-mentioned requirements concerning appearance.

Furthermore, the polymerized composite part is manufactured in an autoclave, i.e. generally on a different site from that where the aircraft is located. This means that the aircraft will be immobilized for a long and costly period.

DISCLOSURE OF THE INVENTION

The invention mainly relates to tooling for on-site repairs of a composite structure with a damaged zone. The tooling restores the original appearance of the composite structure and guarantees mechanical characteristics that are very similar to those of the undamaged structure, thus allowing on-site repairs of relatively large damaged zones.

According to the invention, these results are obtained using on-site repair tooling for composite structures with a concave recess previously machined in a surface of the structure for high-pressure polymerization of a non-polymerized composite part. The shape of the composite part matches that of the recess and the tooling is characterized in that it comprises:

- a bladder capable of being fastened around the said composite part such that it forms a leaktight seal on the surface of the composite structure;
- means for connecting the bladder to an external source of negative pressure;
- means for heating the composite part; and
- means for increasing the pressure applied to the composite part, said means being suitable for being interposed between said composite part and the leaktight bladder.

In a preferred embodiment of the invention the means for increasing pressure comprise a stack of at least two plates with surfaces that gradually increase towards the bladder.

For example, the surfaces of the plates the furthest away from the stack are in a ratio of at least 1:2.

To take into account the fact that that the surface of an aircraft composite structure is not generally plane the plates are preferably made of plane leaf metal that can be stretched to take the shape of the composite structure.

Guiding means are provided to hold the plates in a centered position in relation to each other when pressure is applied by creating a vacuum in the bladder.

These guiding means may comprise at least one guiding pin that projects perpendicularly out of at least one of the plates through guiding holes provided in the other plates.

The surface and the shape of the plate that is closest to the composite part are preferably more or less identical to those of said composite part on the surface of the structure.

According to a characteristic known in the art, the heating means comprise a heating cap that is interposed, in this example, between the bladder and the means for increasing pressure.

The invention also relates to a method for on-site repairs of a composite structure with a damaged zone, characterized in that it comprises the following stages:

- machining a concave recess in the damaged zone in a surface of the structure;
- setting a non-polymerized composite part in the recess, the shape of said composite part matching that of the recess;
- polymerizing the composite part in situ using a vacuum created inside a bladder that is sealed onto the said surface, around said composite part, after means for increasing the pressure applied to the composite part have been interposed between the part and the bladder;
- heating of the composite part.

BRIEF DESCRIPTION OF THE DRAWINGS

A preferred embodiment of the invention will now be described, as a non-limitative example, in reference to the attached drawing in which the sole figure is a schematic representation, shown in a partial cross section, of on-site repair tooling according to the invention positioned on a composite structure with a damaged zone.

DETAILED DISCLOSURE OF A PREFERRED EMBODIMENT OF THE INVENTION

In the sole figure, reference number 10 is a general reference to a composite structure, such as an aircraft structure. The outer surface 12 of the composite structure 10 has a concave recess 14 that has been previously machined using known tooling not included in the invention.

Recess 14 has been machined in a damaged zone of composite structure 10 which is to be repaired on site. The recess 14 has an overall circular shape when seen from above but it may, however, have a different shape, such as an oval, depending on the shape of the damaged zone.

In addition, recess 14 is either step machined, as seen in the figure, or scarf machined using known techniques. Recess 14 is preferably scarf machined as this enables mechanical characteristics to be obtained in the damaged zone that are greater than those obtained when the recess is step machined.

Once recess 14 has been machined a composite part 16 is set into the recess, the shape of said composite part matching that of the recess. It should be pointed out that "composite part" does not refer to a pre-polymerized part but to a non-polymerized assembly comprising long fibers, for example carbon fibers, and an adhesive, such as an epoxy resin to which a softener has been added. Consequently, composite part 16 may be made directly on-site without it being necessary to use an autoclave.

In practice, and using known techniques, composite part 16 can be made either by cutting and superimposing layers of fabric that have been pre-impregnated with resin or by cutting and superimposing layers of dry fabric, being careful to impregnate them layer by layer as they are set in place. Another alternative is to cut and superimpose alternate layers of dry fabric and solid films of adhesive. This technique is preferred as it is easy to perform and obtains high quality results.

According to the invention, composite part 16 is set into recess 14 and polymerized under pressure on the site where composite structure 10 is located. Said composite part is polymerized using repair tooling given the overall number 18.

Repair tooling 18 mainly comprises a leaktight bladder 20, means 22 for heating composite part 16 and means 24 for increasing the pressure applied to said composite part.

The leaktight bladder 20 is slightly larger than composite part 16, such that the peripheral edge may be pressed to form a leaktight seal against outer surface 12 of composite structure 10 around composite part 16 using a leaktight putty 26.

The leaktight bladder 20 is equipped with a valve 28 that constitutes means for connecting the bladder to an external source of negative pressure (not shown). No further description of this arrangement will be given as it is standard technology.

In this example, means 22 for heating composite part 16 comprise a heating cap that is connected to an external power supply (not shown) by electrical conductors (not shown). The heating cap that constitutes the means 22 for heating composite part 16 is interposed between bladder 20 and pressure increasing means 24.

Pressure increasing means 24 constitute the essential characteristic of the invention. They are interposed between bladder 20 and composite part 16, such that the load applied to said composite part is increased when the space 30, formed by composite structure 10 and leaktight bladder 20, is put under negative pressure.

In the preferred embodiment of the invention shown in the sole figure, pressure increasing means 24 comprise a stack of plates 32 whose surfaces gradually increase towards bladder 20. More precisely, the surface and the shape of the plate 32 that is closest to composite part 16 are more or less identical to those of said composite part 16 on the outer surface 12 of composite structure 10. In practice, the plate 32 that is closest to part 16 generally has a slightly larger surface area than that of the surface 12 of part 16.

Moreover, the plate 32 that is closest to composite part 16 is centered on said composite part such that it totally covers the part.

In addition, the plate 32 that is closest to bladder 20 has a surface that is, for example, at least twice that of the plate 32 that is closest to composite part 16. Consequently, when a vacuum is created in space 30 the pressure applied to composite part 16 by the plate 32 that is closest to said part is more or less twice the pressure applied by leaktight bladder 20 to the plate 32 that is furthest away from the composite part.

Given that the degree of negative pressure created in space 30 is generally between 0.7 and 0.9 bar for the primary vacuum sources that are most often used in this application, the addition of pressure increasing means 24 enable at least twice the pressure to be applied compared to that applied with standard tooling. Thus, and purely as an example, pressure measuring approximately 3 bar can be applied to composite part 16 with a 0.9 bar vacuum in space 30 and a 3.75 surface ratio.

It should be noted that the pressure increase factor depends on the ratio of surfaces between the most distant plates of the stack of plates 32, such that the ratio may vary by a factor of three and still remain within the scope of the present invention.

The number of plates 32 constituting the stack can be equal to two and these plates can be rigid when outer surface 12 of composite structure 10 is plane or has a continuous curve of a known value.

In the example of tooling intended to repair the composite structures of aircraft the outer surface of these structures is not generally plane and may have varying degrees of curvature. In this event pressure increasing means 24 are preferably used in which the plates 32 are constituted by a relatively large number of leaf metal planes that can be stretched to take the shape of surface 12 of the composite structure to be repaired.

Relative guiding means are preferably provided to prevent plates 32 sliding against each other when space 30 is put under negative pressure.

In the embodiment shown in the sole figure these relative guiding means comprise a guiding pin 34 that projects perpendicularly out of at least one of the plates 32 through guiding holes 36 provided in the other plates 32. In the example shown, guiding pin 34 is fastened to the center of the plate 32 that is closest to bladder 20 and guiding holes 36 are provided in the center of the other plates 32. It should be noted that other arrangements are also possible, such as several guiding pins 34 being fastened to the same plate 32 or to different plates.

The length of the guiding pin(s) 34 is designed to enable the remaining plates 32 to be guided without, however, the pin(s) projecting beyond the stack of plates. Therefore, the length of the pin(s) is slightly shorter than the accumulated thickness of plates 32 that do not bear any pins.

In the sole figure plates 32 are shown to have spaces between them. This is intended to make the drawing clearer and it is for this reason that pin 34 does not pass through certain plates 32.

It should be noted that the relative guiding means of plates 32 may have a different shape in other modified versions.

A guiding liner 33, positioned around the stack of plates 32, prevents bladder 20 from becoming caught under the stack or between two plates when space 30 is put under negative pressure.

In the above-mentioned example, where only two plates 32 are used, guiding liner 33 that is interposed between composite structure 10 and the bladder around the stack of plates can ensure the relative guiding of plates 32.

The repair tooling 18 of the invention also comprises all the components that generally equip tooling of the prior art. These various components will now be briefly described in reference to the figure.

A drainage fabric 38, the measurements of which are slightly greater than those of heating cap 22, is interposed between said heating cap and leaktight bladder 20. This drainage fabric 38 is used to evacuate air completely when space 30 is put under negative pressure.

The remaining components of repair tooling 18 are positioned between composite part 16 and pressure increasing means 24. Starting from composite part 16, these various components comprise a de-molding fabric 40, a perforated plastic film 42, a drainage fabric 44, a leaktight film 46 and a Mossite film 48.

The de-molding fabric 40 is used to separate tooling 18 from part 16 after polymerization.

The perforated plastic film 42 operates in conjunction with drainage fabric 44 and leaktight film 46 to evacuate air and excess resin towards the periphery when space 30 is put under negative pressure.

Finally, Mossite film 48, which is optional, ensures that the pressure applied to composite part 16 through pressure increasing means 24 is evenly spread.

When a composite structure 10 with a damaged zone is repaired, first of all a concave recess 14 is machined in structure 10 to eliminate all the damaged zones.

Should the damage extend through the entire thickness of composite structure 10, recess 14 must also cross through said thickness. A thin composite plug is then bonded to the base of the recess before the following operations are carried out.

The non-polymerized composite part 16 is then set into recess 14, as described above.

The repair tooling 18, described above, is then installed by connecting valve 28 to the external source of negative pressure and by connecting heating cap 22 to the external power supply.

The adhesive contained in composite part 16 is polymerized under pressure when composite part 16 is heated by heating cap 22 and is put under pressure by space 30 coming under negative pressure. More precisely, pressure, for example of approximately 3 bar, is applied to composite part 16 due to the amplifying action.of pressure increasing means 24.

When the polymerization has finished the heating stops and space 30 is reconnected to the outside atmosphere. Repair tooling 18 can then be removed.

Tests carried out using tooling of this kind show that the external appearance of surface 12 is unchanged in the repaired zone and that the mechanical characteristics in said zone are respectively 79% and 89% of those of the initial structure, depending on whether a step machined or a scarf machined recess 14 is used. The mechanical characteristics are therefore considerably greater than those obtained using techniques of the prior art and enable repair work to be carried out on a far larger scale than has previously been possible.

What is claimed is:

1. Method for on-site repair of a composite structure with a damaged zone, said method comprising the following stages:

machining a concave recess in the damaged zone in a surface of the structure;

setting a non-polymerized composite part in the recess, the shape of said composite part matching that of the recess;

polymerizing the said composite part in situ using a vacuum created inside a bladder that is connected around the composite part to form a leaktight seal with said surface of the composite structure after means for increasing the pressure applied to the composite part have been interposed between the part and the bladder;

heating the composite part; and interposing a stack of plates between the bladder and composite part, wherein the a plate proximate to the bladder has a surface area greater than a surface area of a plate proximate to the composite part.

2. Method of claim 1 wherein means for increasing pressure are interposed, said means comprising a stack of at least two plates with surfaces that gradually increase towards the bladder.

3. Method of claim 2 wherein the plates are guided relative to each other during polymerization.

4. Method of claim 3 wherein the composite part is heated by a heating cap being interposed between the bladder and means for increasing pressure.

* * * * *